UNITED STATES PATENT OFFICE.

IVAN LEVINSTEIN, OF MANCHESTER, COUNTY OF LANCASTER, ENGLAND.

MANUFACTURE OF YELLOW COLORING-MATTER.

SPECIFICATION forming part of Letters Patent No. 289,543, dated December 4, 1883.

Application filed April 5, 1883. (Specimens.)

*To all whom it may concern:*

Be it known that I, IVAN LEVINSTEIN, of Manchester, in the county of Lancaster, England, have invented certain new and useful Improvements in the Manufacture of Coloring-Matter, of which the following is a full, clear, and exact description.

The object of my invention is to produce yellow coloring-matter or mixtures of the same; and the invention consists in producing the said coloring-matter by the action of nitric acid upon the mono and di sulpho acids of nitroso-alpha-naphthol, or upon a mixture of the same.

In carrying out my invention I dissolve ten parts, by weight, of alpha-naphthol in forty parts, by weight, of ordinary commercial rectified sulphuric acid, marking about 170° on Twaddell's hydrometer, at a temperature of about 100° centigrade, (212° Fahrenheit.) As soon as the alpha-naphthol is completely dissolved the temperature is increased to about 130° centigrade, (266° Fahrenheit,) and kept at that heat for about one hour, when the alpha-naphthol will be converted principally into a disulpho-acid of alpha-naphthol. This alpha-naphthol sulpho-acid is diluted with about thirty parts of water, and is then treated with about forty-six parts of nitrite of soda, or as much as will be necessary to convert the same into a nitroso-alpha-naphthol sulpho-acid, taking great care to keep the temperature as low as possible by ice or other means, not allowing it to rise above 10° centigrade, (50 Fahrenheit.) As soon as the entire quantity of nitrite of soda is added, I prepare twenty-four parts of nitric acid of a specific gravity of about 1.456, and dilute this quantity of acid with about twenty-four parts of water, and then add the diluted acid to the nitroso-alpha-naphthol sulpho-acid, and let the whole mixture stand for two or three days, when a precipitate will be deposited, which is removed by filtration, or any other suitable means, forming a yellow coloring-matter, which is nitro-oxidized nitroso-alpha-naphthol sulphuric acid. This precipitate is of a yellow color, resembling earthy lumps, can be pulverized by pressing it between the fingers, is odorless, and has acid properties, and by these characteristics may readily be distinguished from other coloring-matters. It dyes a very bright yellow, which may be used in this state, or may be converted into salts, in a manner well known to chemists.

Instead of allowing the above mixture to stand for two or three days, it may be heated at once to the boiling-point, when the precipitate will be thrown off; but the result is not as satisfactory.

I do not limit myself to the exact strength of the sulphuric acid or nitric acid, nor to the exact temperature, as these may be varied; but I have found that the best results are produced by adhering to the temperature and other data given in the specification.

Having thus described my invention, I claim as new and desire to secure by Letters Patent—

As a new article of manufacture, the yellow coloring-matter having the qualities or characteristics herein set forth.

IVAN LEVINSTEIN.

Witnesses:
GEO. WM. FOX,
*Solicitor, Manchester.*
FRANK SMITH,
*His Clerk.*